United States Patent
Andrews et al.

(10) Patent No.: US 7,546,534 B1
(45) Date of Patent: Jun. 9, 2009

(54) PERSONALIZING ACCESS OF GAME WEB SITE BASED ON USER CONFIGURATION

(75) Inventors: David Andrews, North Bend, WA (US); Eric D. Heutchy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 10/228,879

(22) Filed: Aug. 26, 2002

(51) Int. Cl.
*G06F 3/00* (2006.01)
*G06F 9/44* (2006.01)
*G06F 9/445* (2006.01)

(52) U.S. Cl. .............. 715/747; 715/742; 717/168; 717/174

(58) Field of Classification Search ......... 715/747, 715/742, 744, 745; 705/10; 717/11, 168–170, 717/174, 178; 345/747; 463/1
See application file for complete search history.

(56) References Cited

U.S. PATENT DOCUMENTS

| | | | |
|---|---|---|---|
| 5,579,509 A * | 11/1996 | Furtney et al. .............. 703/27 |
| 6,151,643 A * | 11/2000 | Cheng et al. ................ 710/36 |
| 6,182,094 B1 * | 1/2001 | Humpleman et al. ........ 715/513 |
| 6,185,587 B1 * | 2/2001 | Bernardo et al. ........... 715/513 |
| 6,352,479 B1 * | 3/2002 | Sparks, II .................. 463/42 |
| 6,381,567 B1 | 4/2002 | Christensen et al. .......... 704/8 |
| 6,411,697 B1 | 6/2002 | Creamer et al. ........ 379/201.12 |
| 6,745,236 B1 * | 6/2004 | Hawkins et al. ............ 709/218 |
| 6,955,298 B2 * | 10/2005 | Herle .................... 235/472.01 |
| 7,263,663 B2 * | 8/2007 | Ballard et al. .............. 715/762 |
| 2002/0142842 A1 * | 10/2002 | Easley et al. ................ 463/42 |
| 2003/0115287 A1 * | 6/2003 | Irfan et al. .................. 709/219 |
| 2005/0027382 A1 * | 2/2005 | Kirmse et al. ................ 700/91 |

* cited by examiner

*Primary Examiner*—Ba Huynh
*Assistant Examiner*—Shashi K Becker
(74) *Attorney, Agent, or Firm*—Workman Nydegger

(57) ABSTRACT

A personalized web page displays a subset of multiplayer games available on a game web site, corresponding to game software programs that are installed on a user's computer. When the user connects to the web site, an extended markup language (XML) data file, a web page that is not yet personalized, and a control file are downloaded. An executable instance of an ActiveX™ control program instantiated by JScript included in the web page queries the operating system registry to produce an XML text string listing each software program of a specific type that are installed. The results are then compared to the XML data downloaded from the web site, returning the subset of the games that are available on the web site and also installed on the computer. The web page is then transformed to display the subset, producing the personalized web page.

10 Claims, 7 Drawing Sheets

PERSONALIZING ACCESS OF GAME WEB SITE BASED ON USER CONFIGURATION

FIELD OF THE INVENTION

This invention generally pertains to providing a personalized display for a user visiting a web site, and more specifically, pertains to displaying only those options in which the user can participate from among all of the available interactive options on the web site, based upon software installed on the computing device used to connect to the web site.

BACKGROUND OF THE INVENTION

A person connecting to a web site with a personal computer (PC) will often be presented with a relatively large list of options for interacting with the web site using the PC. The number of interactive options may be so extensive that they may be organized hierarchically, which may help or hinder the person searching the list to identify a desired option to select, depending upon whether the categories clearly relate to a desired interactive option. Furthermore, although many interactive options are listed as available on the web site, the person may be able to participate in only a relatively limited number of those listed. For example, participation in each of the available of interactive options may require prior installation of a specific software program on the person's PC. It can thus be somewhat time consuming and frustrating for a person to find a specific one of the interactive options, since the user must pick an appropriate category, and possibly an appropriate subcategory and then select from among only those options that match the software programs installed on the person's PC.

An example illustrating this problem arises on game web sites that enable multiplayer interactive game play over the Internet or other network. When connecting to such a game web site, a prospective game player is presented with a web page in which a number of different categories of games and the games available to be played under each category are listed. Some of the categories may include so many games that the user must select a "more" option to see the additional games included under the category. Game software installed on the prospective player's PC may only enable the person to participate in a few of the multiplayer games that are listed, yet it may be necessary to scan through the list of games in a selected category to select a game to play, assuming that the person recalls the names of all such games installed on the person's PC. Finding a desired game in the extensive list of available games can frequently take several minutes. Also, if an older version of a game is installed on the person's PC, it may not be immediately evident that the person will be unable to play the newer version of the game available on the game web site, until the person selects the game from the list and attempts to participate in the game on the site.

Clearly, in regard to the game web site example discussed above, it would be desirable for a prospective player to connect to the game web site and be provided a relatively short list that includes only those multiplayer games that are installed on the person's PC and which are available for play on the game web site. The list should thus include only those games for which an acceptable version of the game software has been installed on the PC, avoiding the disappointment that may occur if the person selects a game and then is advised that additional software must be purchased and installed on the person's PC in order for the person to participate in multiplayer play of the selected game on the web site. The same approach should also be applicable to providing a personalized web page that includes other types of options presented to a person connecting to a web site, so that only those options for which the appropriate required software is installed on the person's PC will be presented in the personalized web page. It will clearly be much more efficient to enable a choice of only the options in which the person can actually participate.

Currently, Microsoft Corporation's MSN MESSENGER™ instant messaging program automatically determines the multiplayer games that are installed on a participant's PC and displays a list of the games when the person selects the Activity Menu, where each such installed game is listed in an entry as "Start (game name)." The user can select one of these listed options along with a contact who will be invited to play the game, assuming that the invited contact also has the game installed on the PC used by the contact when responding to the invitation. However, the listed installed game programs are simply added to the menu of MSN MESSENGER, and there is not interaction between the PC and any server hosting a game. Instead, the list of games is created by MSN MESSENGER without regard to anything other than the gaming software installed on the user's PC. Accordingly, the approach used in MSN MESSENGER would not be helpful in addressing the problem of selecting a game from among a hierarchical or long list of games on a game web site, as discussed above.

SUMMARY OF THE INVENTION

A key aspect of the present invention is that a person accessing a web site should not be required to view all of the interactive options that are available at the web site, since the list or hierarchical categories in which the options are presented may be rather lengthy, and the person may not be able to actually participate in many of the interactive options that require specific software programs be installed on the person's computer or other computing device that is being used to connect to the web site. Accordingly, one aspect of the present invention is directed to a method for personalizing a web page displayed to a user when accessing such a web site so that the personalized web page only lists those available interactive options in which the user may participate, thus enabling the user to more efficiently select one of the interactive options.

When a user connects to a web site, an "unpersonalized" web page (i.e., a web page that does not list only the available interactive options in which the person may actually participate), a control program, and data indicating all of the interactive options available at the web site are downloaded to the user's computing device. The unpersonalized web page includes instructions that are executed by the computing device before the web page is displayed, to enable the web page to be personalized. The instructions cause the computing device to determine the subset of the available interactive options that include only those interactive options in which the user can participate, since specific software will be required to be installed on the user's computer/computing device to enable participation in a corresponding interactive option. To create the subset, the instructions cause the control program to automatically identify each software program of a specific type that is installed on the computing device. This information is NOT transmitted back to the web site. A match is then made between the software programs thus identified and corresponding entries in the data for each of the available interactive options. Then, a personalized web page that includes the subset of interactive options is created from the downloaded web page. The personalized web page is displayed on the computing device, so that it is viewable by the user, enabling the user to select one of the interactive options from the subset, which is displayed as a markup language list within the web page.

The instructions comprise a script program (JavaScript, in a preferred embodiment). Execution of the script program by the computing device instantiates an executable instance of the control program, which is in Microsoft Corporation's ActiveX™ format in a preferred form of the present invention. This instance of the control program is executed by the computing device, causing the computing device to query the specific keys in the registry of the operating system running on the computing device. Information included in the registry key enables identification of any software programs of the specific type that are installed on the computing device, to produce the markup language text string.

EXtensible Stylesheet Language (XSL) instructions are preferably executed by the computing device to produce a union of markup language format entries (preferably in eXtended Markup Language (XML) form) in the data and the markup language text string (also preferably in XML) identifying each software program of the specific type that is installed on the computing device, to produce the subset included in the personalized web page displayed on the computing device.

The user can optionally manually add other interactive options to the personalized web page that are not included within the data received from the web site. For example, the data received from the web site may include only a specific type of interactive options, such as games purchased as retail, while the user may also want the personalized web page to list interactive options of a different type, such as games that are available from the site for free download.

In an exemplary application of the present invention, the interactive options comprise different multiplayer games that are available at a game web site. Many multiplayer games require a corresponding game software program to be installed on the computing device to enable the user to employ the computing device to participate in playing the multiplayer game over a network, e.g., over the Internet.

Another aspect of the present invention is directed to a method for enabling a server to cause a client computing device to create a personalized web page that includes a subset of a list of interactive options available at a web site. The steps of this method are generally consistent with the steps of the method already discussed above, but relate to providing the components needed for a client computer to create a personalized web page.

Yet another aspect of the present invention is directed to a system that includes a memory and a processor used to carryout functions generally consistent with the steps of the first method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing the Present Invention

Figure 1:
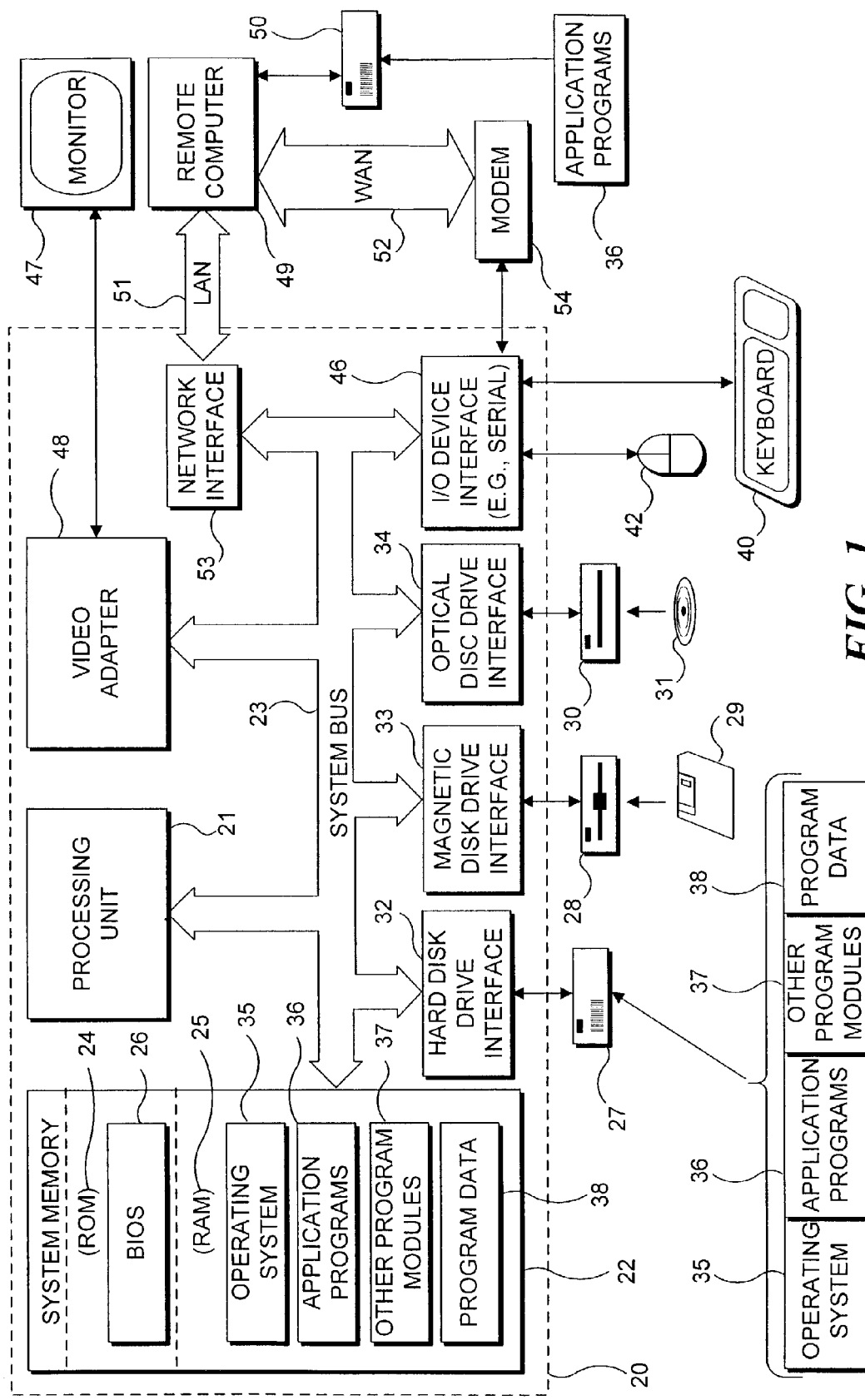
FIG. 1 is a schematic block diagram of a conventional personal computer (PC) that is useful for carrying out the present invention.

FIG. 1 and the following discussion related thereto are intended to provide a brief, general description of a suitable computing environment in which the present invention may be implemented. This invention is preferably practiced using computing devices that typically include the functional components shown in FIG. 1. Although not required, the present invention is described as employing computer executable instructions, such as program modules that are executed by a processing device. Generally, program modules include application programs, routines, objects, components, functions, data structures, etc. that perform particular tasks or implement particular abstract data types. Also, those skilled in the art will appreciate that this invention might conceivably be practiced with other computer system configurations, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like.

With reference to FIG. 1, an exemplary system for implementing the present invention (and suitable for either the server, or the client computing device of the user) includes a general purpose computing device in the form of a PC 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within computer 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as CD-ROM or other optical media. Hard disk drive 27, magnetic disk drive 28, and optical disk drive 30 are connected to system bus 23 by a hard disk drive interface 32, a magnetic disk drive interface 33, and an optical disc drive interface 34, respectively. The drives and their associated computer readable media provide nonvolatile storage of computer readable instructions, data structures, program modules, the image files, and other data for PC 20.

Although the exemplary environment described herein employs a hard disk, removable magnetic disk 29, and removable optical disc 31, it will be appreciated by those skilled in the art that other types of computer readable media, which can store images files and other data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disc 31, or in ROM 24 or RAM 25, including an operating system 35, one or more application programs 36, other program modules 37, and program data 38. A user may enter commands and information into PC 20 through input devices such as a keyboard 40, graphics pad, and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port, a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, web pages, and/or other information. In addition to the monitor, the server may be coupled to other peripheral output devices (not shown), such as speakers (through a sound card or other audio interface, not separately shown), and printers.

PC 20 is preferably included in a networked environment using logical connections to connect it to one or more other computers, such as a remote computer 49. Remote computer 49 may be a server, a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such network environments are well known and are common in offices, enterprise wide computer networks, intranets, in some residences, and the Internet.

When used in a LAN network environment, PC 20 is connected to LAN 51 through a network interface or adapter 53. When used in a WAN network environment, PC 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46, i.e., through a serial port. In a network environment, data, and program modules depicted relative to PC 20, or portions thereof, may be stored in the remote memory storage device. It will be appreciated that the network connections shown are exemplary and other means of establishing a communications link between the computers may be used, such as wireless communication and wideband network links.

Logic Employed in Implementing the Present Invention

Figure 2:
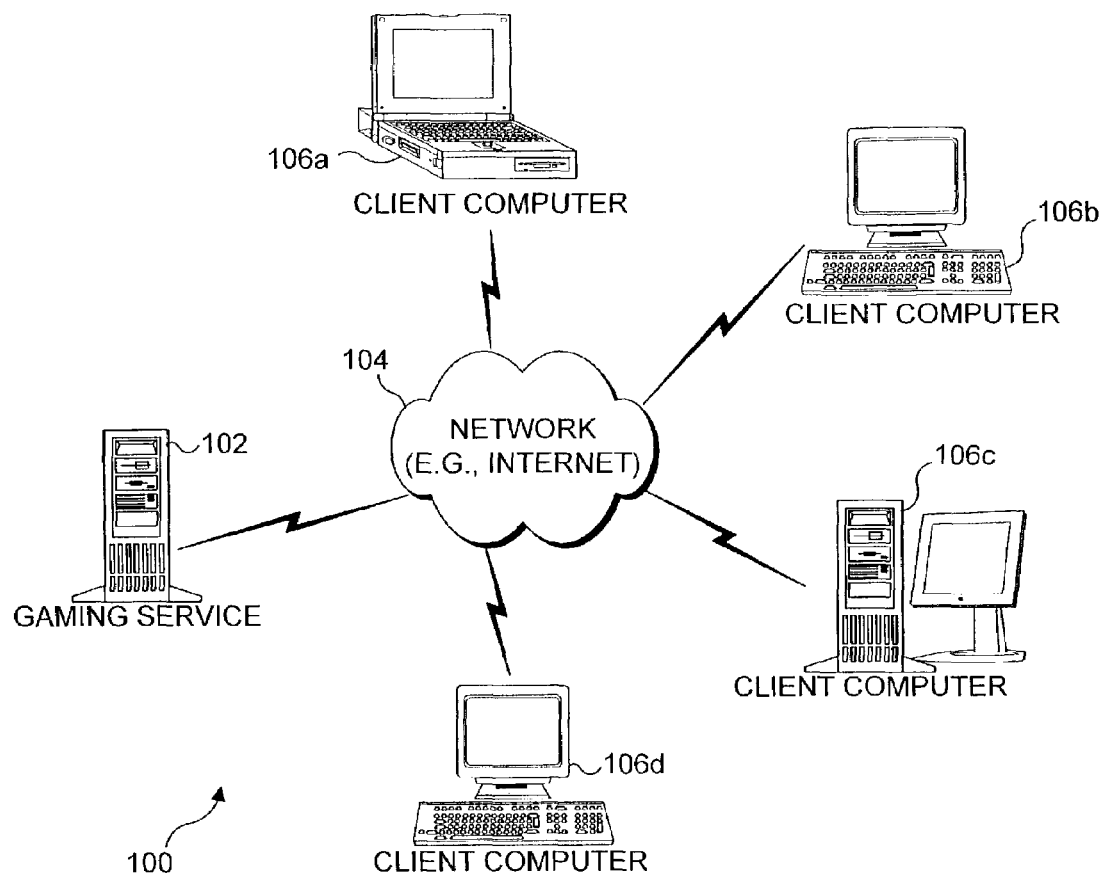
FIG. 2 is a simplified schematic block diagram of network that couples a plurality of computing devices in communication with a game service to facilitate play of a multiplayer game.

FIG. 2 illustrates an exemplary network 100 of client computers 106a-106d that are coupled to an online game service 102 over a network 104, such as the Internet. Although game service 102 is illustrated in this schematic representation as running only one server, it will be understood that a game service typically will include many such servers, since thousands of client computers are typically coupled to the game service through the Internet at any time.

While not limited to this exemplary application in which a user is connected to a game service, the present invention is disclosed below in connection with the gaming application, since it will likely first be employed commercially to simplify the selection of a multiplayer game by a user connecting to game service 102. As noted above, game service 102 may provide users access to a relatively large number of different games, many of which are multiplayer. However, each client computer that is connected to the game service can only play those games that are installed on the client computer; i.e., stored on the hard drive (or loaded into memory) on the client computer connecting to the game service. For example, client computer 106a may have installed on it only two of the many multiplayer games that are available for selection on game service 102. It might require considerable time for the user of client computer 106a to find those two games within the list of available games on the game service. However, the present invention is capable of providing a personalized web page that lists only the available multiplayer games in which the user of client computer 106a can participate, i.e., only the multiplayer games available on the game web site that are also installed on the user's computer. Similarly, each of the other client computers 106b, 106c, and 106d (and all of the other client computers that may be connected to game service 102 but are not shown in this simplified schematic diagram) will prefer to have a personalized web page that lists only the multiplayer games in which their respective users can participate, i.e., limited to only those multiplayer games installed or loaded in memory on the respective client computers of these other users.

When connecting to a game web site that is set up to facilitate use of the present invention, no specific action is required by a user to enable display of a personalized web page providing a list of only those multiplayer games in which the user can participate. The creation of the personalized web page is generally independent of any action by the user (other than requesting the web page on which the available multiplayer games are included) and does not require the user take any affirmative action to specifically install software needed to create a personalized web page of this type. Instead, the user simply connects to the web site that hosts the multiplayer games. Optionally, it may be required that the user also log in as a member who is entitled to participate in any of the multiplayer games available at the game web site. When connecting to the game web site, the user's PC (or other computing device) sends a request for a web page listing the available games, to enable the user to select a game in which to participate. In response to a PageLoad request from the suer, the server downloads several items. One of the downloaded items is a web page (unpersonalized), which includes JavaScript (JScript) that will be executed on the user's computer. Also downloaded are an ActiveX™ control and an XML file that has entries indicating the multiplayer games available for play on the game web site.

Figure 3:
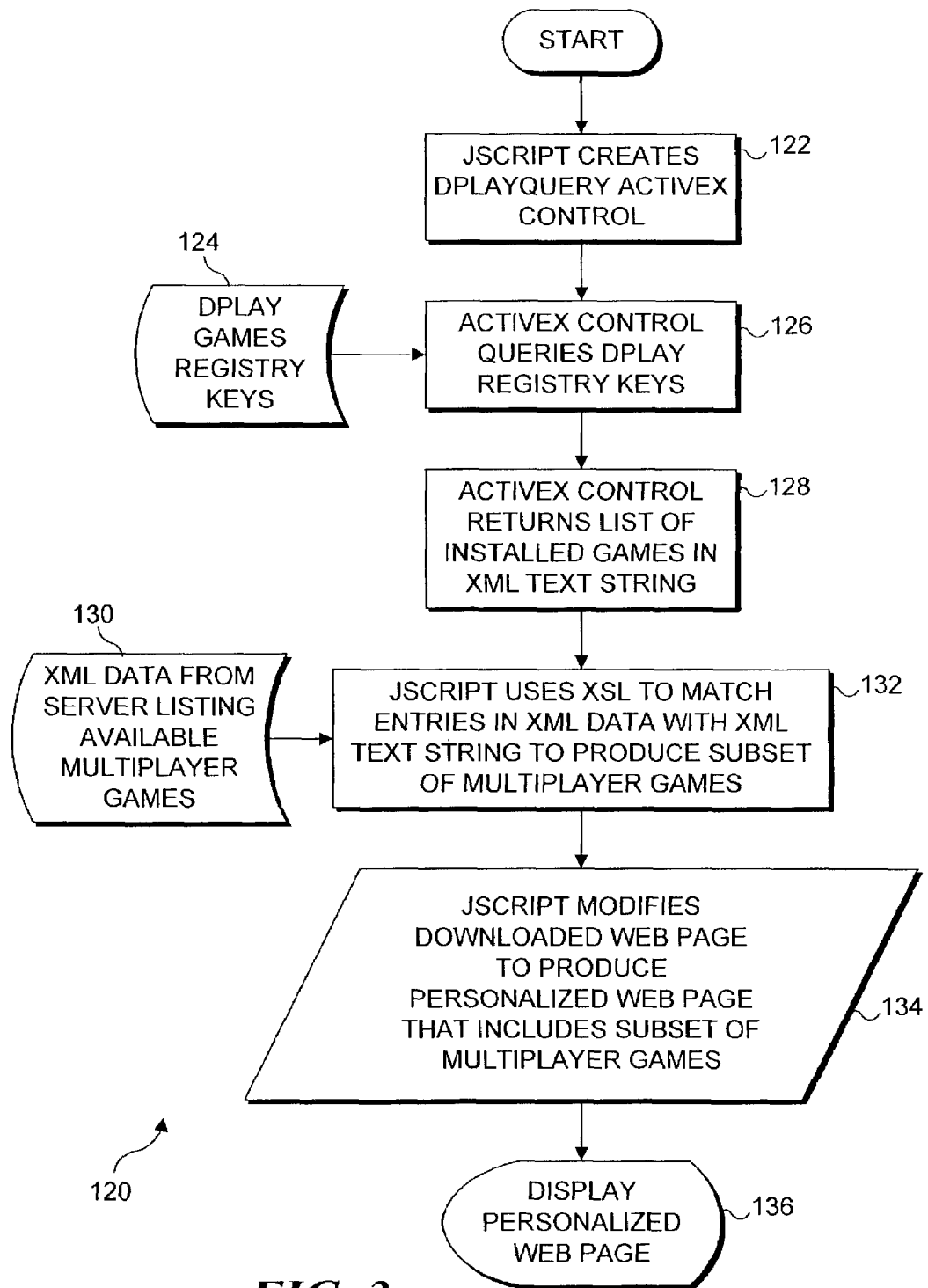
FIG. 3 is a flow chart of the logic implemented in a preferred embodiment of the present invention.

Details of the steps implemented on the user's computer to create a personalized web page based upon the web page downloaded from the server are shown in FIG. 3. In a step 122, JScript included in the web page downloaded from the server creates an executable instance of a direct play (DPlay) query ActiveX control from a corresponding ActiveX control stored on the server. On the user or client computing device, the ActiveX control is executed to query DPlay registry keys 124 as indicated in a block 126. The DPlay games registry keys are a portion of the registry used by the operating system on the user's computer for registering each of a specific type of game that is installed on the computing device. Each of the multiplayer games that are available on the game web site are of this type and would be included within the DPlay games registry keys if installed on the user's computer. Accordingly, as indicated in a step 128 the ActiveX control returns a list of installed games in an XML text string. It should be understood that some of the games that are included with the XML text string may not be among the multiplayer games that are available on the game web site to which the user has connected.

Included with the web page downloaded from the game web site are XML data listing the available multiplayer games as indicated in a block 130. The operator of the game web site has the option of including only specific multiplayer games in the XML data, perhaps choosing to exclude any multiplayer games that are not available to be purchased through at retail—either through a store, distributor, or online. For example, the operator of the web site may choose to exclude free multiplayer games from the XML data associated with the web page downloaded from the server.

In a step 132, the JScript executes XSL instructions that match entries in the XML data text string with equivalent entries in the XML data that was downloaded from the server, to produce a subset of multiplayer games from all those that are available on the server and are also included within the entries in the XML text string data of the software game programs installed on the user's computing device. Thus, the subset includes only those multiplayer games that are within both the XML text string of games installed on the user's computer, and within the XML data downloaded from the server. The subset therefore represents the union of the XML text string produced by the ActiveX™ control and the XML data from the server.

In a step 134, the JScript modifies the downloaded web page (unpersonalized) to produce a personalized web page that includes a listing of the subset of the multiplayer games in a HyperText Markup Language (HTML) format. The present invention then enables the personalized web page to be displayed in the user's web browser program (e.g., using Microsoft Corporation's INTERNET EXPLORER™ browser program), as indicated in a step 136. Since only those games that are available on the web site and are also installed on the user's computer are listed within the personalized web page, the user can readily select one of the multiplayer games that is displayed in the personalized web page for play with other users who are coupled to the game web site.

It is very important to note that during the creation of the personalized web page, no information concerning games actually installed on the user's computer is transmitted back to the server. Accordingly, the present invention does NOT in any way jeopardize the privacy of a user in regard to the games installed on the user's computer, since that information remains on the user's computer.

Figure 4:
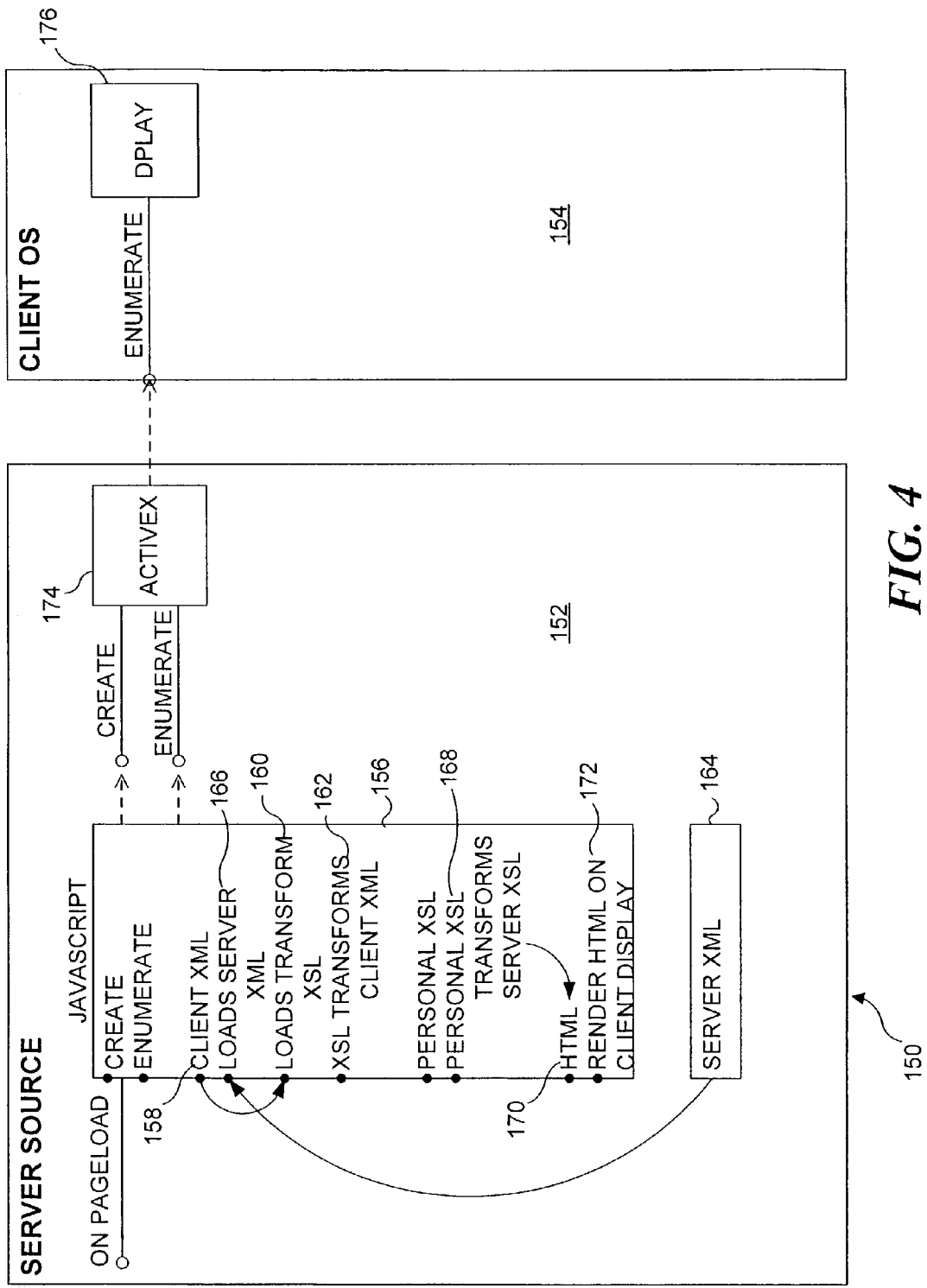
FIG. 4 is a schematic diagram indicating functional steps implemented with server source material in conjunction with a client operating system, to create a personalized web page in accord with the present invention.

In a block diagram 150 of FIG. 4 a somewhat different representation provides additional details that help to explain how the present invention creates a personalized web page. Block diagram 150 is divided into two major blocks, including a server source block 152 and a client operating system block 154. Server source block 152 includes the components and functions that are carried out in regard to the web page, XML file, and ActiveX™ control that are received from the server when a request is made by the client to load a web page that enables a game to be selected for play by the user. This web page includes JScript that creates an executable instance of an ActiveX™ control 174 used to enumerate the games that are installed on the user's computer, by querying entries under a DPlay key 176 that is part of the registry of the operating system running on the user's computer. The enumeration returns a client (i.e., user) XML text string 158 for use by JScript 156. Server XML 164, which was a file also downloaded from the server and which includes entries listing the multiplayer games available for play on the server, is loaded by an instruction 166. The JScript then uses client XML text string 158 as input to transform XSL instructions 160. As indicated by reference number 162, the XSL instructions form a union of the client XML text string and the server XML, producing the subset of multiplayer games available on web site that are also installed on the client computer.

The JScript then creates a personal XSL instruction set that is applied to the web page downloaded from the server, as indicated by reference number 168, transforming the server XSL by including HTML used for displaying the subset of multiplayer games on the personalized web page, as indicated by HTML 170. Finally, JScript instructions 172 render the personalized web page with the HTML on the client display.

Figure 5:
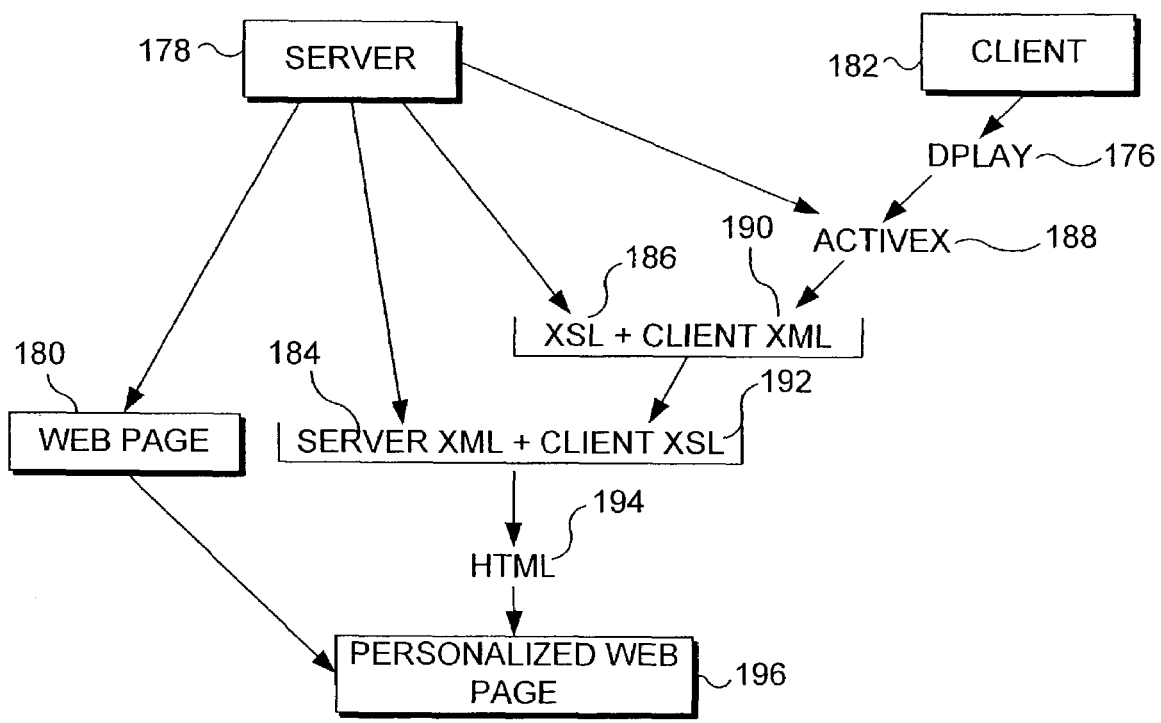
FIG. 5 is a schematic diagram illustrating the material provided by the server and the client computing devices to implement the present invention.

Yet another representation of the relationship between the components obtained from the server and the information under a DPlay registry key 176 is illustrated in FIG. 5. In this Figure, a server 178 is accessed at the game web site. A client 182 (which is the user's computer or other computing device) connects in communication with the server. In response to a request from the client, server 178 downloads a web page 180 (unpersonalized). Also downloaded is a server XML file 184 that lists the entries indicating the plurality of multiplayer games available to be used on the web site where server 178 resides. XSL instructions 186 are also downloaded from server 178 as well as an ActiveX™ control 188. An executable instance of ActiveX™ control 188 is then instantiated and executed by the client, causing a query to be made of the DPlay registry key 176 on the registry of the operating system executed by client 182, returning a client XML text string listing all of the direct play games installed on client 182. XSL instructions 186 then form a union of the client XML 190 and server XML 184, producing a subset of multiplayer games that are available to be played on server 178 and which are also installed on client 182. In addition, a client XSL instruction set 192 is produced that defines how the web page 180 will be modified by creating HTML 194 for inclusion within web page 180 to produce a personalized web page 196 displaying only those multiplayer games that are both available on server 178 and are installed on client 182.

Figure 6:
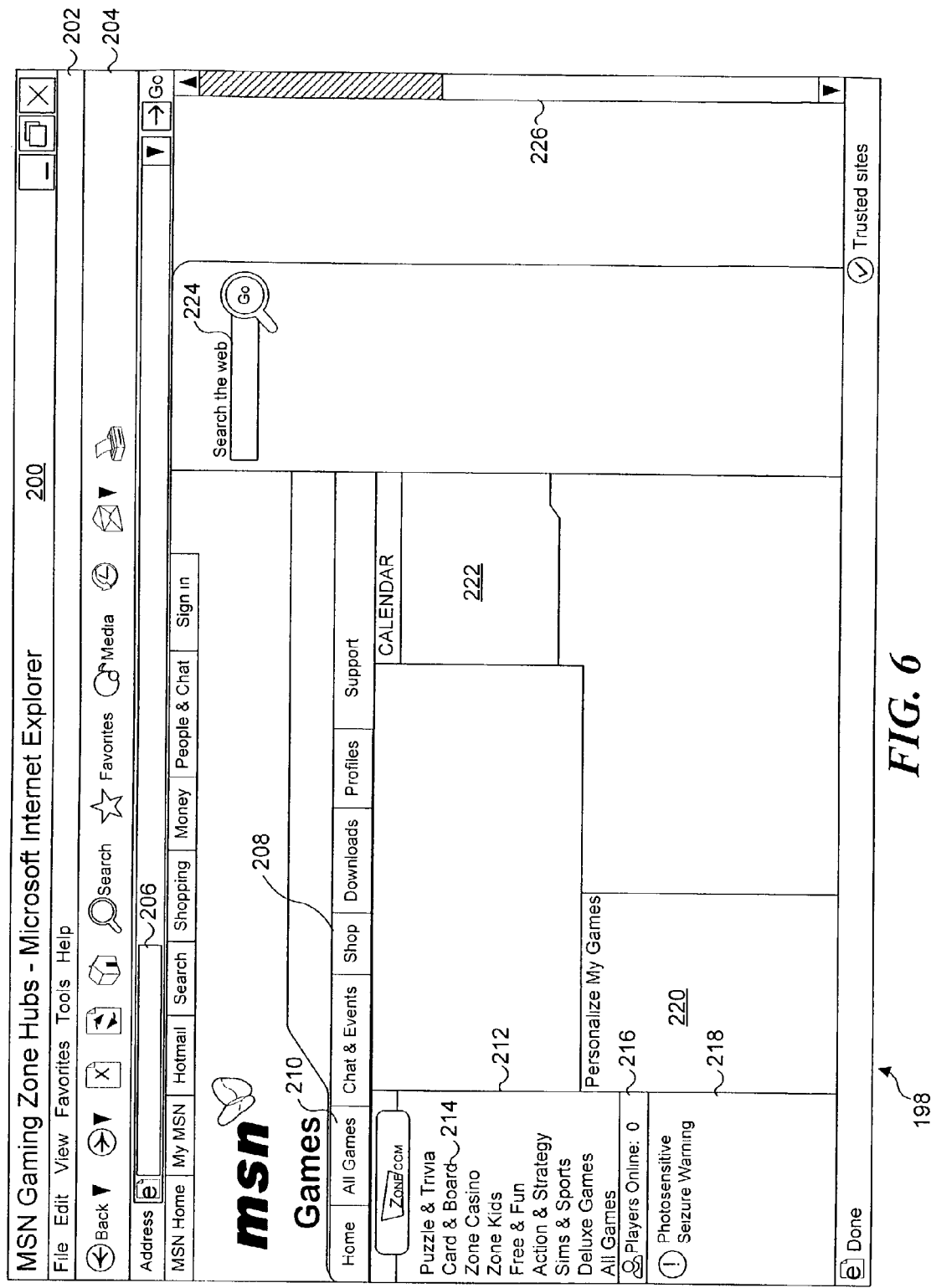
FIG. 6 is an exemplary web page received from the server, prior to being personalized.

An exemplary web page 198 (unpersonalized) that might be downloaded from Microsoft Corporation's MSN Gaming Zone is illustrated in FIG. 6. Web page 198 includes a title bar 200, a menu bar 202, a button bar 204, and a text address box 206, as is generally provided in Microsoft Corporation's INTERNET EXPLORER™ browser program. More specific to the details of web page 198, an option bar 208 is included on this web page to enable a user to open other web pages on the site that are generally related to game play. Of greatest importance to the present invention is an option 210 included on this option bar for listing all of the games available on the site in alphabetical order. This option can be selected if the user is unable to determine the category 212 that should be selected to attempt to find the game the user desires to play and which is also known to be installed on the user's computer. The confusion caused by trying to determine an appropriate category 212, by selecting for example, a specific category 214, or alternatively, scanning through a list of what may eventually be hundreds of games by selecting option 210, is addressed by the present invention. Additional information provided on the web page includes an indication of the current number of players online in a box 216, a photosensitive seizure warning 218 that can be selected to display further information about this potential problem, a block 220 that enables the user to personalize the choice of games available to be selected on the site, and a calendar of special events/activies 222. The user can optionally search the web site with text entered in a text box 224, and can scroll to disclose other portions of the web page using a conventional scroll bar 226.

Web page 198, which is unpersonalized, is typical of the kind of web page provided to a user under the prior art, requiring the user to access one of categories 212, such as specific category 214, to display card and board games, if the user wants to play that type of game and has the required software game program installed on the computer being used to connect to the game web site. However, the categories in which certain types of games involving multiplayer participation might be placed may not be readily apparent. Accordingly, the user may be forced to select option 210, to display the alphabetical listing of all games available for play on the site, which can be frustrating, since it may require several minutes to actually identify the game desired within a relatively long list of games.

Figure 7:
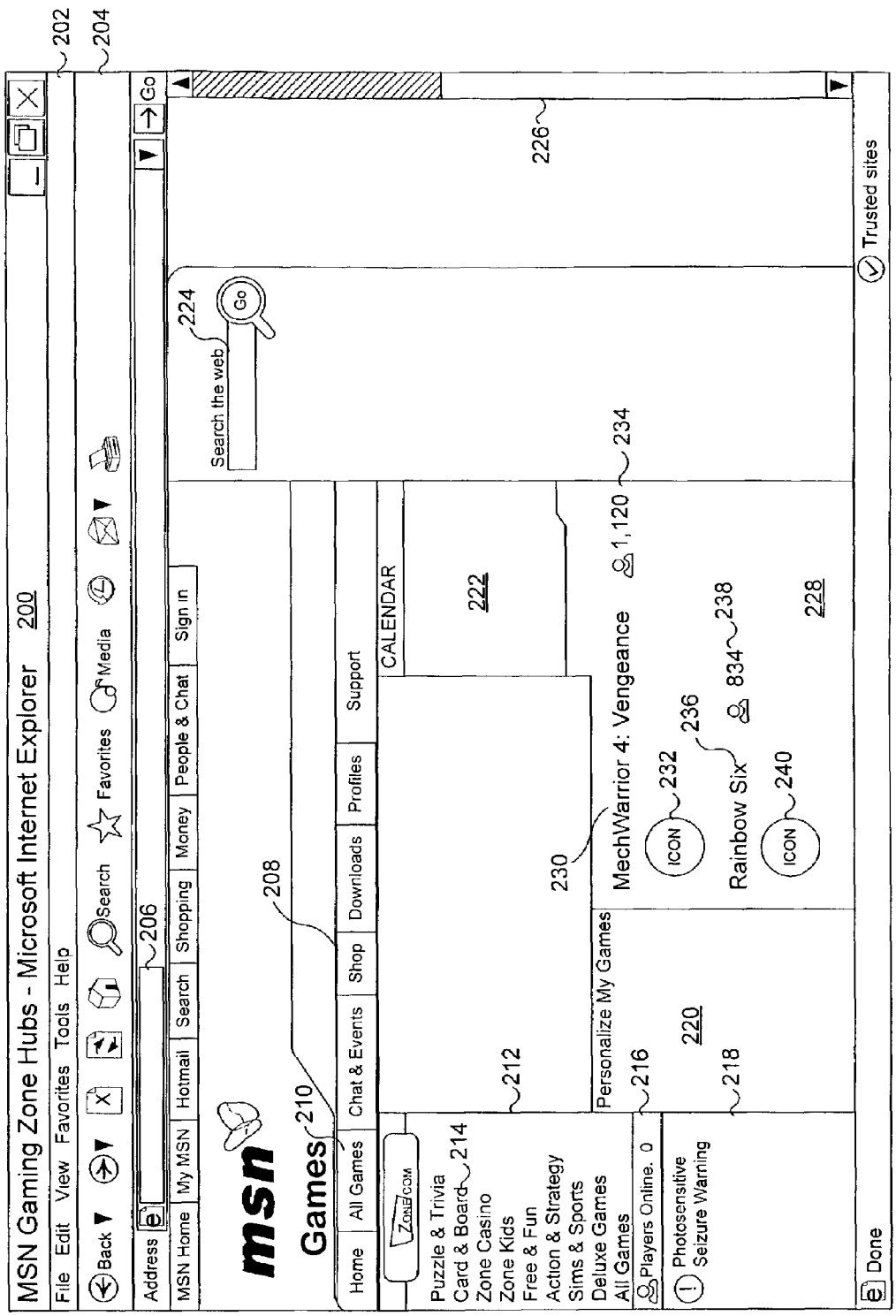
FIG. 7 is the exemplary web page of FIG. 6 as modified to provide the personalized web page in accord with the present invention.

In contrast to the problems involved in selecting a multiplayer game using the unpersonalized web page, as shown in FIG. 7, the present invention produces a personalized web page 198', which is substantially identical to web page 198, but which includes HTML specifically identifying the available multiplayer games that are also installed on the user's computer, in a section 228 of the personalized web page. In the simplified example in FIG. 7, only two such multiplayer games are displayed. A first game 230 is "MechWarrior 4: Vengeance™" and a corresponding icon 232 is provided for the game. Either the text name or the icon can be selected by the user to initiate participation in the game by the user. Reference number 234 indicates the current number of people participating in the multiplayer game.

A second multiplayer game 236 included in section 228 is identified as "Rainbow Six™" and currently has 834 people participating as indicated by a reference number 238. An icon 240 or the text identifying the game can be selected to initiate participation by the user in this game. It will be readily apparent that by providing only two options, which are the only two multiplayer games that are both installed on the user's computer and available to play at the game web site, it is possible for the user to much more efficiently select the game desired than was possible in the prior approach.

It is contemplated that as a further option, the user will be enabled to optionally cause one or more other games to be displayed on the personalized web page, although these added games are not included within the XML data file downloaded from the server. By providing this option, the user will be able to further customize personalized web page 198', thereby improving the ease with which the user can select a desired game to play on the game web site.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for personalizing a gaming web page displayed to a user on the user's client computing device when accessing an online game service at which a plurality of interactive games are available from which the user may select to play on the user's client computing device, such that the personalized web page lists only interactive games for which the user has compatible software installed on the client computing device, the method comprising the steps of: (a) from the online game service, downloading to the client computing device of the user accessing the gaming web site: (i) an unpersonalized gaming web page for the online game service; (ii) data listing the plurality of interactive games supported by the gaming web site and included for listing on the unpersonalized gaming web page, wherein each of the plurality of interactive games requires a specific software program installed on the client computer device of the user; and (iii) instructions specifying how the data listing the plurality of interactive games will be used to modify the unpersonalized gaming web page to create a personalized gaming web page, wherein the instructions are in a scripting language; (b) at the client computing device, executing the instructions in the scripting language on the client computing device, wherein executing the instructions causes the client computing device of the user to: (i) creating, at the client computing device, an instance of a control program stored by the online game service, the instance of the control program being an ActiveX control stored by the online game service; (ii) execute the ActiveX control with the client computing device, which ActiveX control causes the client computing device to query a registry of an operating system running on the client computing device for direct play (DPlay) registry keys to identify each specific gaming software program installed on the client computing device that supports participation by the client computing device in any of the interactive games of the online game service, (iii) receive, from the control program, a markup language text string which includes all multiplayer games installed on the client computing device and having DPlay registry keys, which multiplayer games installed on the client computing device include multiplayer games supported by the gaming web page and one or more multiplayer games not supported by the gaming web page; and (iv) compare each specific gaming software program installed on the client computing device with the listing of the plurality of interactive games included on the unpersonalized gaming web page and downloaded from the online gaming service and determine a subset of interactive games that includes only interactive games included on the unpersonalized gaming web page which are also installed on the client computing device of the user, wherein comparing including executing the instructions in the scripting language and, in turn, executing additional instructions that are XSL instructions and match entries in the markup language text string with interactive games supported by the gaming web sit as provided in the data listing the plurality of interactive games downloaded to the client computing device; (c) at the client computing device of the user, executing the instructions of the scripting language and thereby modifying the unpersonalized gaming web page to create a personalized gaming web page that includes a listing of only the subset of interactive games which are included in the unpersonalized gaming web page and already installed on the client computing device of the user, and which are supported by the online gaming service; and (d) displaying the personalized gaming web page for the online gaming service on the client computing device of the user, thereby enabling the user to only view the subset of interactive games which are already installed on the client computing device and to select an interactive game in which to participate using the client computing device, from among the subset of interactive games included on the personalized gaming web page.

2. The method of claim 1, wherein the control program matches the entries in the data to the markup language text string identifying each such gaming software program, producing the subset of interactive games in a markup language format for use in displaying the personalized gaming web page on the client computing device.

3. The method of claim 2 wherein the data are in a markup language format, further comprising the step of forming a union of the data and the markup language text string, to produce the subset of the interactive options.

4. The method of claim 1, wherein the plurality of interactive games comprise a plurality of different multiplayer games.

5. The method of claim 1, further comprising the step of enabling the user to manually add other interactive games to the personalized gaming web page that are not included within the data received from the web site.

6. The method of claim 1, wherein: the scripting language is JavaScript, the markup language text string is an XML text string.

7. A client system for providing a personalized gaming web page for display to a user who has connected to a server of an online gaming service over a network to access a gaming web site at which a plurality of interactive games are available from which the user may select to play on the client system, comprising: (a) a display; (b) a memory usable to store registry information, an unpersonalized gaming web page, a script for initializing an executable instance of a control program, data, instructions for modifying the unpersonalized gaming web page to create a personalized gaming web page, an operating system for running on the client system, and a registry of the operating system; (c) a network interface; and (d) a processor that is coupled to the display, to the network interface, and to the memory, said processor being coupled in communication with the server over the network using the network interface and downloading the data, the control program, and the instructions from the gaming web site, said data providing a listing of the plurality of interactive games available at the gaming web site and which require a specific gaming software program to be stored in a memory of the client computing device, said instructions, when executed by the processor, causing the processor of the client system to: (i) create, at the client computing device, an instance of a control program stored by the online game service, the instance of the control program being an ActiveX control stored by the online game service; (ii) execute the ActiveX control with the client computing device, which ActiveX control causes the client computing device to query a registry of an operating system running on the client computing device for direct play (DPlay) registry keys to identify each specific gaming software program installed on the client computing device that supports participation by the client computing device in any of the interactive games of the online game service, (iii) receive, from the control program, a markup language text string which includes all multiplayer games installed on the client computing device and having DPlay registry keys, which multiplayer games installed on the client computing device include multiplayer games supported by the gaming web page and one or more multiplayer games not supported by the gaming web page; and (iv) compare each specific gaming software program installed on the client computing device with the listing of the plurality of interactive games included on the unpersonalized gaming web page and downloaded from the online gaming service and determine a subset of interactive games that includes only interactive games included on the unpersonalized gaming web page which are also installed on the client computing device of the user, wherein comparing includes executing the instructions in the scripting language and, in turn, executing additional instructions that are XSL instructions and match entries in the markup language text string with interactive games supported by the gaming web sit as provided in the data listing the plurality of interactive games downloaded to the client computing device; (c) at the client computing device of the user, executing the instructions of the scripting language and thereby modifying the unpersonalized gaming web page to create a personalized gaming web page that includes a listing of only the subset of interactive games which are included in the unpersonalized gaming web page and already installed on the client computing device of the user, and which are supported by the online gaming service; and (d) displaying the personalized gaming web page for the online gaming service on the client computing device of the user, thereby enabling the user to only view the subset of interactive games which are already installed on the client computing device and to select an interactive game in which to participate using the client computing device, from among the subset of interactive games included on the personalized gaming web page.

8. The client of claim 7, wherein the instructions specifying how the data listing the plurality of interactive games will be used to modify the unpersonalized gaming web page to create a personalized gaming web page further enable other interactive games to be added to the personalized web page that are not included within the data received from the gaming web site.

9. A computer-readable storage medium having stored thereon computer-readable instructions that, when executed by a processor, cause a client computing system connectable to an online game service to: (a) from the online game service, downloading to the client computing device of the user accessing the gaming web site: (i) an unpersonalized gaming web page for the online game service; (ii) data listing the plurality of interactive games supported by the gaming web site and included for listing on the unpersonalized gaming web page, wherein each of the plurality of interactive games requires a specific software program installed on the client computer device of the user; and (iii) instructions specifying how the data listing the plurality of interactive games will be used to modify the unpersonalized gaming web page to create a personalized gaming web page, wherein the instructions are in a scripting language; (b) at the client computing device, executing the instructions in the scripting language on the client computing device, wherein executing the instructions causes the client computing device of the user to: (i) creating, at the client computing device, an instance of a control program stored by the online game service, the instance of the control program being an ActiveX control stored by the online game service; (ii) execute the ActiveX control with the client computing device, which ActiveX control causes the client computing device to query a registry of an operating system running on the client computing device for direct play (DPlay) registry keys to identify each specific gaming software program installed on the client computing device that supports participation by the client computing device in any of the interactive games of the online game service, (iii) receive, from the control program, a markup language text string which includes all multiplayer games installed on the client computing device and having DPlay registry keys, which multiplayer games installed on the client computing device include multiplayer games supported by the gaming web page and one or more multiplayer games not supported by the gaming web page; and (iv) compare each specific gaming software program installed on the client computing device with the listing of the plurality of interactive games included on the unpersonalized gaming web page and downloaded from the online gaming service and determine a subset of interactive games that includes only interactive games included on the unpersonalized gaming web page which are also installed on the client computing device of the user, wherein comparing includes executing the instructions in the scripting language and, in turn, executing additional instructions that are XSL instructions and match entries in the markup language text string with interactive games supported by the gaming web sit as provided in the data listing the plurality of interactive games downloaded to the client computing device; (c) at the client computing device of the user, executing the instructions of the scripting language and thereby modifying the unpersonalized gaming web page to create a personalized gaming web page that includes a listing of only the subset of interactive games which are included in the unpersonalized gaming web page and already installed on the client computing device of the user, and which are supported by the online gaming service; and (d) displaying the personalized gaming web page for the online gaming service on the client computing device of the user, thereby enabling the user to only view the subset of interactive games which are already installed on the client computing device and to select an interactive game in which to participate using the client computing device, from among the subset of interactive games included on the personalized gaming web page.

10. The computer-readable storage medium of claim 9, wherein the instructions specifying how the data listing the plurality of interactive games will be used to modify the unpersonalized gaming web page to create a personalized gaming web page further enable a user to manually add other interactive games to the personalized gaming web page that are not indicated by entries in the data.

* * * * *